(12) United States Patent  (10) Patent No.: US 7,996,555 B2
Holloway, Jr.  (45) Date of Patent: *Aug. 9, 2011

(54) JOB SITE COMMUNICATIONS SYSTEMS, METHODS, AND COMPUTER PROGRAM PRODUCTS

(76) Inventor: Edwards Holloway, Jr., Raleigh, NC (US)

( * ) Notice: Subject to any disclaimer, the term of this patent is extended or adjusted under 35 U.S.C. 154(b) by 98 days.

This patent is subject to a terminal disclaimer.

(21) Appl. No.: 12/497,224

(22) Filed: Jul. 2, 2009

(65) Prior Publication Data

US 2010/0174803 A1  Jul. 8, 2010

Related U.S. Application Data

(63) Continuation of application No. 10/936,260, filed on Sep. 8, 2004, now Pat. No. 7,571,233.

(60) Provisional application No. 60/504,409, filed on Sep. 18, 2003.

(51) Int. Cl.
*G06F 15/16* (2006.01)

(52) U.S. Cl. ............... 709/232; 709/206; 709/227

(58) Field of Classification Search .............. 709/232, 709/206, 227
See application file for complete search history.

(56) References Cited

U.S. PATENT DOCUMENTS

| | | | | |
|---|---|---|---|---|
| 5,206,934 A * | 4/1993 | Naef, III | ............... | 709/204 |
| 5,452,099 A * | 9/1995 | Von Meister | ............... | 358/403 |
| 5,826,198 A * | 10/1998 | Bergins et al. | ............... | 455/557 |
| 5,983,073 A * | 11/1999 | Ditzik | ............... | 455/11.1 |
| 6,049,892 A * | 4/2000 | Casagrande et al. | ............... | 714/18 |
| 6,192,396 B1 * | 2/2001 | Kohler | ............... | 709/206 |
| 6,219,668 B1 * | 4/2001 | Arnaud et al. | ............... | 709/203 |
| 6,237,025 B1 * | 5/2001 | Ludwig et al. | ............... | 709/204 |
| 6,332,150 B1 * | 12/2001 | Khan et al. | ............... | 715/207 |
| 6,522,884 B2 * | 2/2003 | Tennison et al. | ............... | 455/445 |
| 6,535,922 B1 * | 3/2003 | Kikinis | ............... | 709/236 |
| 6,643,684 B1 * | 11/2003 | Malkin et al. | ............... | 709/206 |
| 6,674,767 B1 * | 1/2004 | Kadyk et al. | ............... | 370/466 |
| 6,687,874 B2 * | 2/2004 | Burgess | ............... | 715/205 |
| 6,842,772 B1 * | 1/2005 | Delaney et al. | ............... | 709/206 |
| 6,963,923 B1 * | 11/2005 | Bennett | ............... | 709/232 |
| 6,990,504 B2 * | 1/2006 | Powell et al. | ............... | 1/1 |
| 7,103,357 B2 * | 9/2006 | Kirani et al. | ............... | 455/426.1 |
| 7,171,216 B1 * | 1/2007 | Choksi | ............... | 455/456.1 |
| 2004/0201622 A1 * | 10/2004 | Rhodes et al. | ............... | 345/751 |
| 2006/0129631 A1 * | 6/2006 | Na et al. | ............... | 709/203 |

OTHER PUBLICATIONS

International Search Report for corresponding PCT Application No. PCT/US04/29092 dated Apr. 20, 2005.
Written Opinion for corresponding PCT Application No. PCT/US04/29092 dated Apr. 20, 2005.
International Search Report for corresponding PCT Application No. PCT/US04/29092 dated Apr. 20, 2005.
Written Opinion for corresponding PCT Application No. PCT/US04/29092 dated Apr. 20, 2005.

* cited by examiner

*Primary Examiner* — Aaron Strange
(74) *Attorney, Agent, or Firm* — Jim Passé; Passé Intellectual Property, LLC

(57) ABSTRACT

Job site communications systems, methods, and computer program products. According to one embodiment of the subject matter disclosed herein, a job site communications system is provided. The job site communications system can include a wireless communications device adapted to be positioned at a job site and operable to wirelessly communicate annotated computer-aided design documents from the job site. The job site communications system can also include a computer positioned at a site remote from a job site and operable to receive or transmit the computer-aided design documents.

7 Claims, 18 Drawing Sheets

FIG. 8

JOB SITE COMMUNICATIONS SYSTEMS, METHODS, AND COMPUTER PROGRAM PRODUCTS

RELATED APPLICATIONS

This application is a continuation of U.S. patent application Ser. No. 10/936,260 filed on Sep. 8, 2004 now U.S. Pat. No. 7,571,233 which claims the benefit of U.S. Provisional Patent Application Ser. No. 60/504,409, filed Sep. 18, 2003, the disclosure of which is incorporated herein by reference in its entirety.

TECHNICAL FIELD

The subject matter disclosed herein relates generally to communications systems and methods. More particularly, the subject matter disclosed herein relates to communications systems and methods for allowing communication of computer-aided design (CAD) documents between a job site and a location remote from the job site.

BACKGROUND ART

Work projects occurring at job sites, such as construction job sites, typically require frequent communication between job site personnel and off-site personnel located remote from the job site. Job site personnel can include project managers, superintendents, foremen, job crew personnel, and sub-contractors. Off-site personnel can include architects, engineers, project managers, and construction project developers or owners. Job site and off-site personnel typically communicate by the exchange of documents, such as computer-aided design (CAD) drawings, paper-based blueprints, daily reports, regulatory compliance forms, and punch lists. These are typically paper documents and thus require communication via postal mailing or other delivery by hand.

Currently, the communications systems used by job site and off-site personnel include cellular telephones and facsimile machines. These communications systems lack the ability to conveniently store, update, and communicate the array of complex documents typically exchanged by job site and off-site personnel. Additionally, these communications systems lack the ability to clearly and conveniently communicate job site problems that need professional resolution, such as by an architect or engineer. Thus, a communications system is needed that is operable to communicate the types of documents and other data typically exchanged between job site and off-site personnel.

Therefore, it is desired to provide a communications system that can electronically communicate documents, such as CAD drawings, daily reports, regulatory compliance forms, punch lists, and any other job site-related documents between a job site and a remote location.

SUMMARY

According to one aspect, a job site communications system is provided. The job site communications system can include a wireless communications device adapted to be positioned at a job site and operable to wirelessly communicate annotated computer-aided design documents from a job site. The job site communications system can also include a computer positioned at a site remote from a job site and operable to transmit or receive the computer-aided design documents.

According to a second aspect, a method for communication with a job site by means of a communications system is provided. The method can include a step for providing a job site communications system at a job site. The system can include a wireless communications device adapted to be positioned at a job site and operable to wirelessly transmit job site documents from a job site. The system can also include a computer positioned at a site remote from a job site and operable to receive the job site documents. The method can include a step for transmitting job site documents from the wireless communications device at the job site. The method can also include a step for receiving the job site documents at the computer remote from the job site.

According to a third aspect, a second embodiment of a job site communications system is provided. The job site communications system can include a computer positioned at a site remote from a job site and operable to automatically transmit computer-aided design documents. The job site communications system can also include a wireless communications device adapted to be positioned at a job site and operable to receive the computer-aided design documents from a job site.

According to a fourth aspect, a second embodiment of a method for communication with a job site by means of a communications system is provided. The method can include a step for providing a job site communications system at a job site. The system can include a computer positioned at a site remote from a job site and operable to automatically transmit computer-aided design documents. The system can also include a wireless communications device adapted to be positioned at a job site and operable to receive the computer-aided design documents from a job site. Further, the method can include a step for automatically transmitting computer-aided design documents from the computer remote from the job site. The method can also include a step for receiving the computer-aided design documents at the wireless communications device at the job site.

Some of the objects of the subject matter disclosed herein having been stated hereinabove, other objects will become evident as the description proceeds when taken in connection with the accompanying drawings as best described hereinbelow.

BRIEF DESCRIPTION OF THE DRAWINGS

Exemplary embodiments of the subject matter disclosed herein will now be explained with reference to the accompanying drawings, of which:

FIG. 8 is an illustration of an exemplary screen display of a tablet PC displaying a product order form;

DETAILED DESCRIPTION

Figure 1:
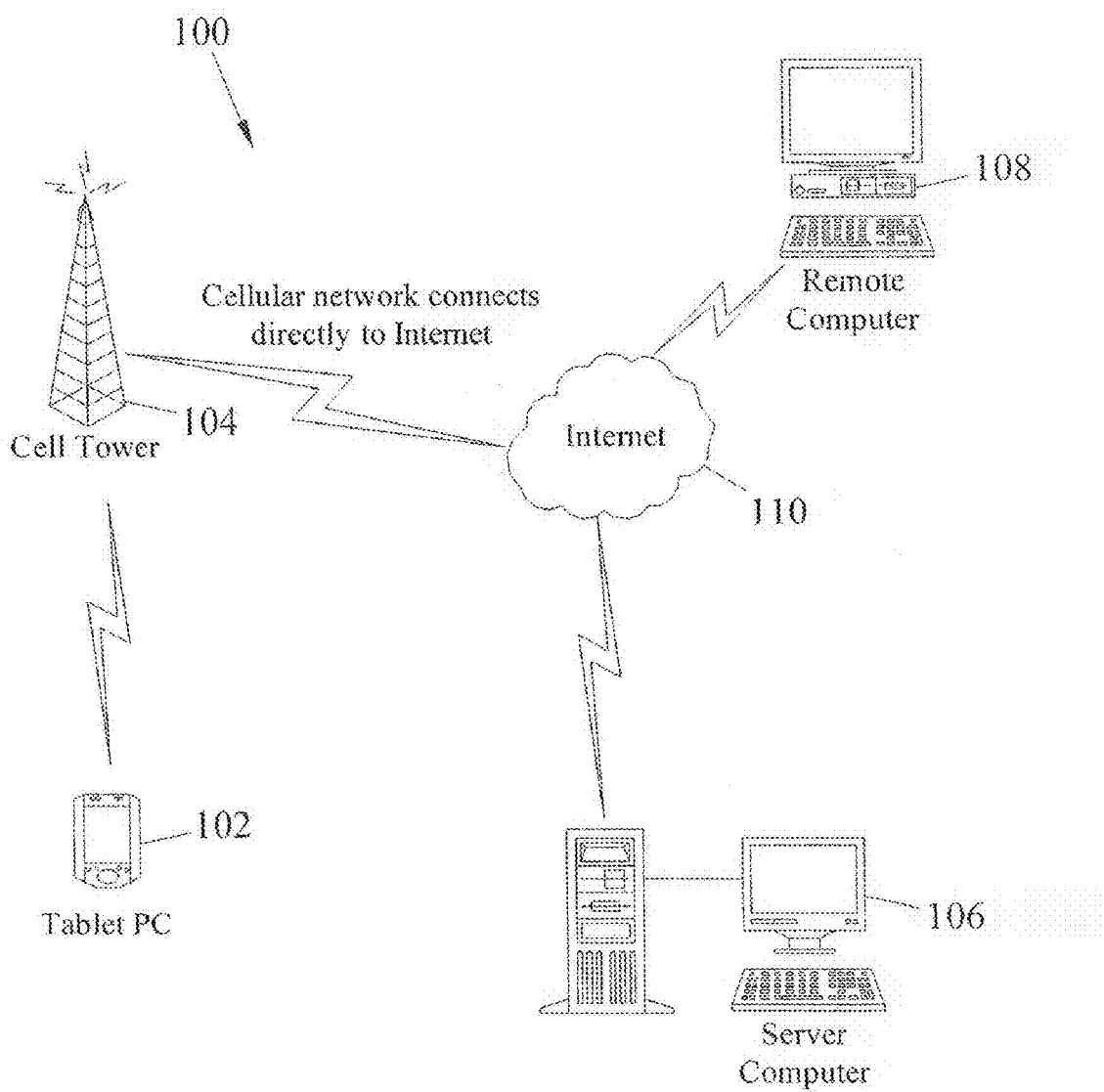
FIG. 1 is a schematic diagram of a job site communications system.

Job site communications systems, methods, and computer program products are provided for allowing communication between a job site and a location remote to the job site. In particular, systems, methods, and computer program products are provided for communicating annotated computer-aided design (CAD) documents or drawings, annotated digital photographs, and other data between a job site and a location remote to the job site. FIG. 1 illustrates a schematic diagram of a job site communications system, generally designated 100. Job site communications system 100 can include the following: a tablet personal computer (PC) 102; a wireless base station 104 including a cellular telephone tower; a server computer 106; and a remote computer 108. Tablet PC 102 can be located at a job site. Base station 104, server computer 106 and remote computer 108 can be located remote from tablet PC 102.

The functionality of tablet PC 102 can be implemented in hardware, software, firmware, or any combination thereof. Tablet PC 102 can also include a software application (or computer program product), referred to herein as CONSTRUCTCONNECT™ software application, for operating tablet PC 102 to wirelessly communicate with wireless base station 104, annotate CAD documents, and receive and store digital photographs. Alternative to tablet PC 102, another suitable wireless communications device, such as a personal data assistant (PDA) (e.g., the PALMPILOT® PDA provided by Palm, Inc. of Milpitas, Calif.), a notebook computer, a cellular telephone, a pocket personal computer (PC) (as send/receive), text cellular telephone, and pagers (as a receive-only device or receive/transmit device), can communicate with base station 104.

Figure 2:
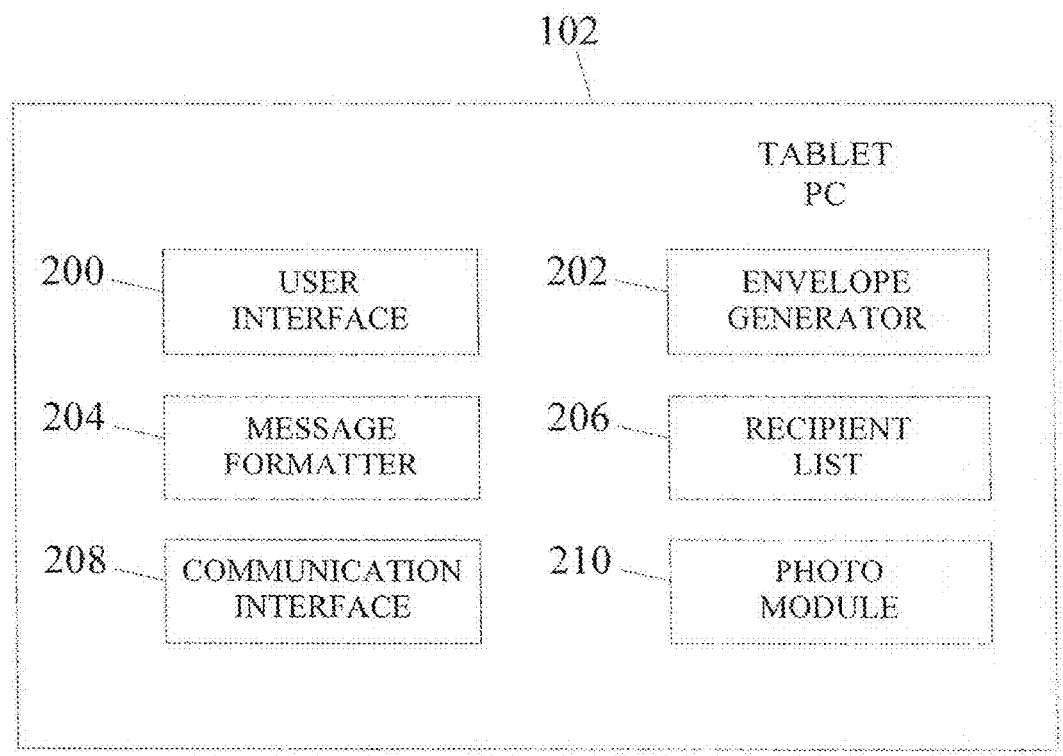
FIG. 2 is a block diagram of a tablet PC.

FIG. 2 illustrates a block diagram of tablet PC 102 according to one embodiment. Tablet PC 102 can include a user interface 200 such as a touchscreen display, stylus, or keyboard for receiving operator input and displaying text and pictures to the operator. Tablet PC 102 can also include an envelope generator 202 for generating an empty meta-document, digital envelope for storing and transmitting selected documents stored on tablet PC 102. A message formatter 204 can populate the envelope with CAD drawings (annotated or not annotated), photographs, notes, and sketches. Tablet PC 102 can also include a recipient list 206 listing recipient devices for receiving the envelope. A communication interface 208 is operable to communicate wirelessly with base station 104 for delivering the envelope to server computer 106 and remote computer 108. Tablet PC 102 can also include a photo module 210, such as a digital camera, for capturing photographs of the requested area of the job site. The CONSTRUCTCONNECT™ software application can include instruction for implementing the functions of one or more of modules 200, 202, 204, 206, 208, and 210.

Referring again to FIG. 1, base station 104 can communicate data between tablet PC 102 and remote computer 108. Base station 104 can also communicate with server computer 106. Server computer 106 can receive and store data transmitted between tablet PC 102 and remote computer 108. Server and remote computers 106 and 108 can communicate data between a wire communications system, such as the Internet 110. Remote computer 108 can be a conventional computer having an Internet connection with a web browser and an electronic mail (e-mail) client.

Referring to FIG. 1, tablet PC 102 can utilize communication interface 208 to wirelessly communicate with base station 104 in a cellular-based connection and run the CONSTRUCTCONNECT™ software application. Tablet PC 102 can be used at a job site, such as a construction site, for communicating CAD documents and other types of job documentation with base station 106. Additionally, tablet PC 102 can communicate and process paper-based daily reports and punch lists, voice and paper-based ordering material, and delivery scheduling. Tablet PC 102 can store CAD drawings, project specifications, site plans, addendums, modifications, shop drawings, and regulatory information for user access.

Referring again to FIG. 2, photo module 210 can comprise a digital camera for photographing an area of a job site, such as a portion of a construction site, for documenting progress at the job site. User interface 200 can display a photograph taken with the digital camera and permit annotation of the photograph. Subsequently, the annotated photograph can be transmitted to server computer 106 or remote computer 108.

Figure 3A:
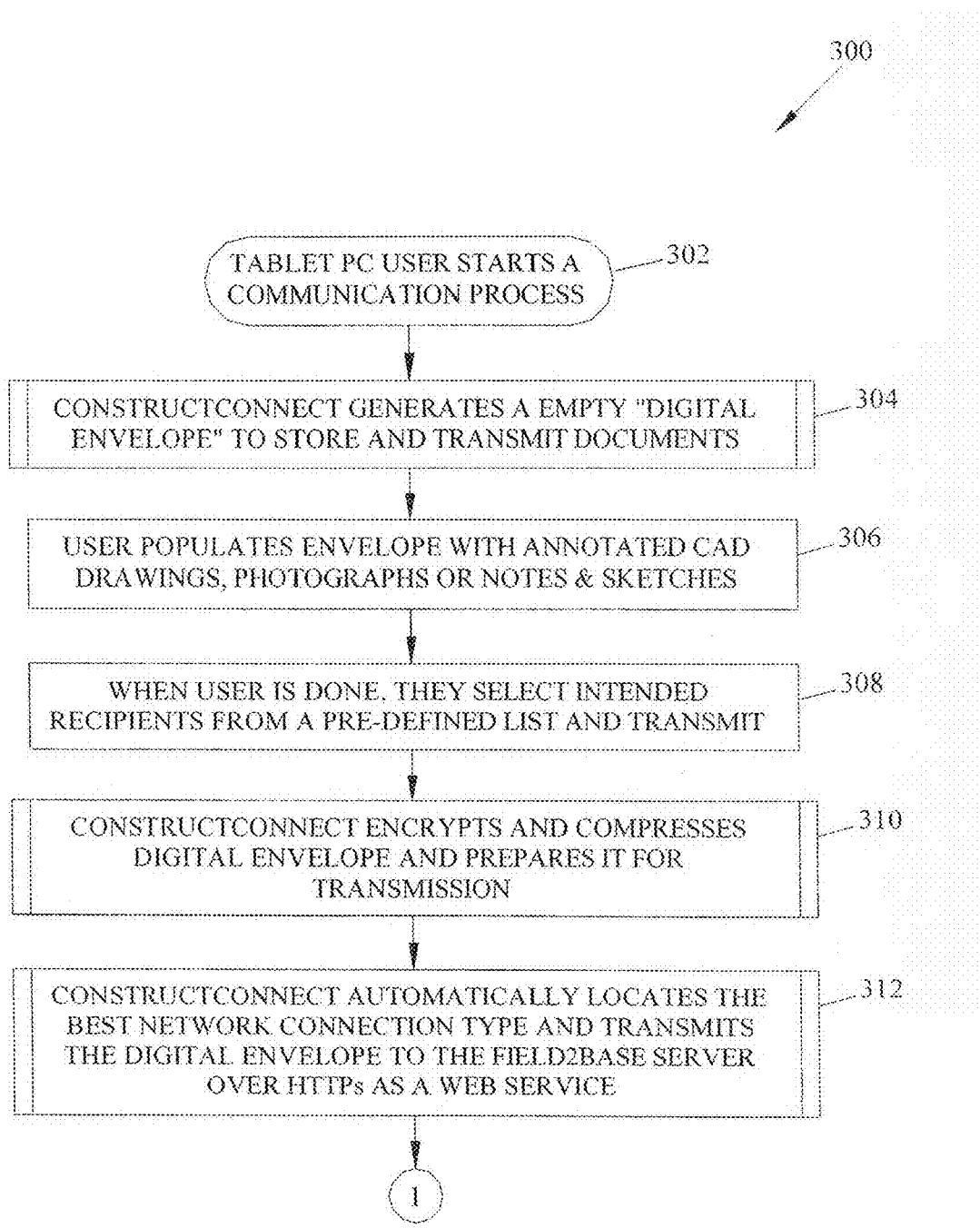
FIGS. 3A and 3B are flow charts of a process for transmitting documents from a tablet PC to a remote computer.
Figure 3B:
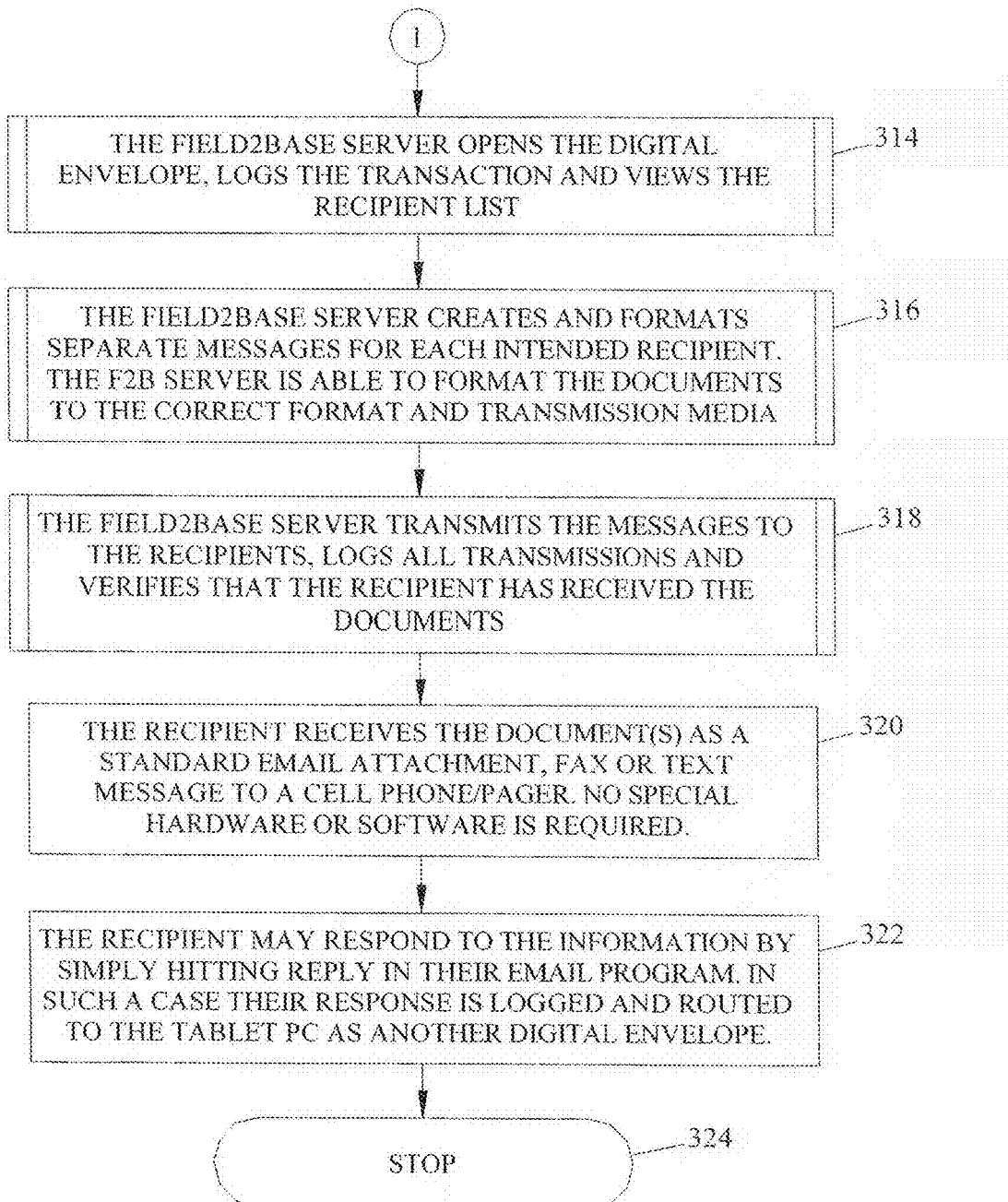

Referring to FIGS. 3A and 3B, a flow chart, generally designated 300, is provided which illustrates a process for transmitting documents from a tablet PC, such as tablet PC 102 shown in FIG. 1, to a remote computer, such as remote computer 108 shown in FIG. 1. Referring specifically to FIG. 3A, the process begins at the step indicated by reference numeral 302 where a tablet PC user starts the communication process. At step 304, envelope generator 202 (FIG. 2) or, alternatively, the CONSTRUCTCONNECT™ software application, can generate an empty meta-document, digital envelope for storing and transmitting selected documents stored on tablet PC 102. Next, the user can operate tablet PC 102 to populate the envelope with CAD drawings (annotated or not annotated), photographs, notes, and sketches (step 306). The tablet PC user can then select recipient devices from a predefined list stored in recipient list 206 (FIG. 2) and transmit the envelope to the selected recipient devices (step 308).

At step 310, message formatter 204 can secure, encrypt, and compress the envelope and further prepare the envelope for transmission. The envelope can include a manifest document for communication to remote computer 108 (FIG. 1). The bundled files can include scanned CAD documents, digital photographs, daily reports, and punch lists. The envelope can also include any paper-based form documents that the user has converted to digital format. In addition, electronic notes, sketches, and voice recordings can be included in the envelope.

At step 312, the CONSTRUCTCONNECT™ software application can automatically locate a preferred network connection type from among a number of available connections (such as wire, dial-up, Wi-Fi connection, and cellular) and transmit the envelope to a server computer, such as server computer 106 shown in FIG. 1, via the preferred network connection type. The envelope can be transmitted over HTTP (hypertext transfer protocol) or HTTPS (hypertext transfer protocol over secure socket layer (SSL)) as a web service.

Referring to FIG. 3B, server computer 106 can receive and open the envelope into individual files and a manifest file (step 314). Prior to document transmission, server computer 106 can determine a preferred file format for transmission to a remote system, such as remote computer, a facsimile machine, or another remote wireless device, such as a cell phone, pager, or PDA. The preferred file format can be any appropriate file format for utilization or viewing by remote computer 108. Next, server computer 106 can convert the documents, such as a CAD document, into the preferred file format and version and transmit the document to server computer 106.

Server computer 106 can also log the transaction and view the recipient list. Server computer 106 can store a complete and detailed logging of all transactions between tablet PC 102 and remote computer 108. The data on a particular transaction can include date, time, list of documents transmitted, actual document data, binary document data, sender, receiver(s), unique identifier for transaction, senders location (e.g., global positioning satellite (GPS)), sending hardware identification, and proof of receipt. Additionally, a conventional computer including a web interface can view the logged information.

Server computer 106 can also create and format separate messages for each intended recipient device (step 316). The messages can be formatted for transmission as a standard e-mail attachment, a facsimile transmittal, a text message for a cell phone or pager, or a desktop client messenger application for standard web service. Server computer 106 can format the documents to an appropriate format and transmission media. Next, server computer 106 can transmit the messages to the recipient devices, log the transmissions, and verify that the recipient device has received the documents (step 318).

At step 320, the recipient device can receive the document as a standard e-mail attachment, a facsimile transmittal, a text message for a cell phone or pager, or a desktop client messenger application for standard web service. When receiving the document via e-mail, the recipient device can respond to the document receipt by selecting reply in an e-mail application (step 322). Alternatively, the recipient device can respond to the document receipt by selecting reply in a web interface or a custom web service. When responding via the reply in the e-mail application, the response is logged and routed to tablet PC 102 of the transmitter as another envelope. Next, the process can stop (step 324).

FIGS. 3A and 3B describes a process for transmitting documents from a tablet PC, such as tablet PC 102 shown in FIG. 1, to a remote computer, such as computer 108 shown in FIG. 1. According to one embodiment, a similar process can be used for transmitting documents from a remote computer to a computer. This may include any of the documents described herein.

Server computer 108 can store documents communicated between tablet PC 102 and remote computer 106 for ensuring that operators receive the latest revisions of all documentation from server computer 108 while maintaining an archive of previous versions. Server computer 108 can also include a queuing system for the communicated data for ensuring that communicated data is received by the intended recipient device. Tablet PC 102 can be responsible for finding a wireless connection for itself. If tablet PC 102 is transmitting data, it is tablet PC's 102 responsibility to queue data until it locates a valid connection. If server computer 106 queues the data until tablet PC 102 finds a valid connection and retrieves it. In particular, if wireless service is not available, documents can be queued and client computer 106 can search for a good wireless connection. When a wireless connection is found by the table PC client, server computer 106 can automatically transmit the documents. Additionally, server computer 106 can transmit a message indicating that particular data is available at server computer 106. Server computer 106 can also log all received communications.

Figure 4:
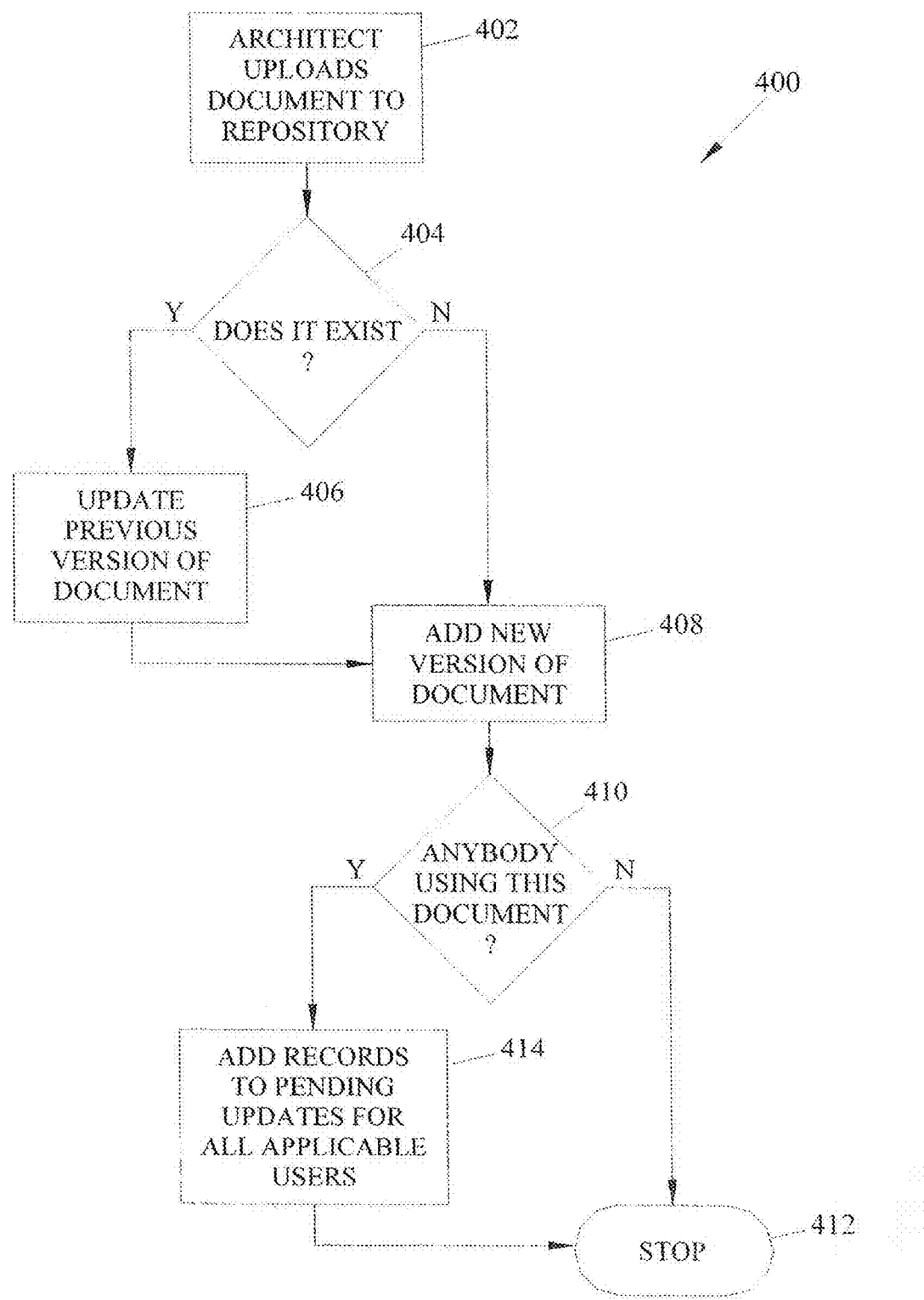
FIG. 4 is a flow chart of a process for transmitting documents from a server computer to a wireless communications device.

Referring to FIG. 4, a flow chart, generally designated 400, is provided which illustrates a process for transmitting documents from a server computer, such as server computer 108 shown in FIG. 1, to a wireless communications device, such as tablet PC 102. The process begins at the step indicated by reference numeral 402 where off-site personnel, such as an architect, uploads a document to a repository database on server computer 108. At step 404, server computer 108 determines whether a previous version of the uploaded document exists on the server computer's database. If a previous version does exist, the previous version is updated with the uploaded version (step 406). Otherwise, the uploaded version is added to the server computer's database (step 408). Next, at step 410, server computer 108 determines whether any known wireless communications device is using the document. If no known wireless communications device is using the document, the process stops (step 412). Otherwise, the uploaded document is added to a pending updates list for all applicable users (step 414) and then the process stops (step 412). Once the documents are in the pending updates list, the documents can be automatically downloaded to specific wireless devices.

Server computer 108 can be operated by a service provider charging a fee for access and service. The service can include all network routing, communication, logging, and document storage for job site communications system 100. Additionally, a web-based interface operating on a conventional personal computer or wireless communications device can provide operators with access to system log files and documents. The web-based interface can be secure and password controlled.

Figure 5:
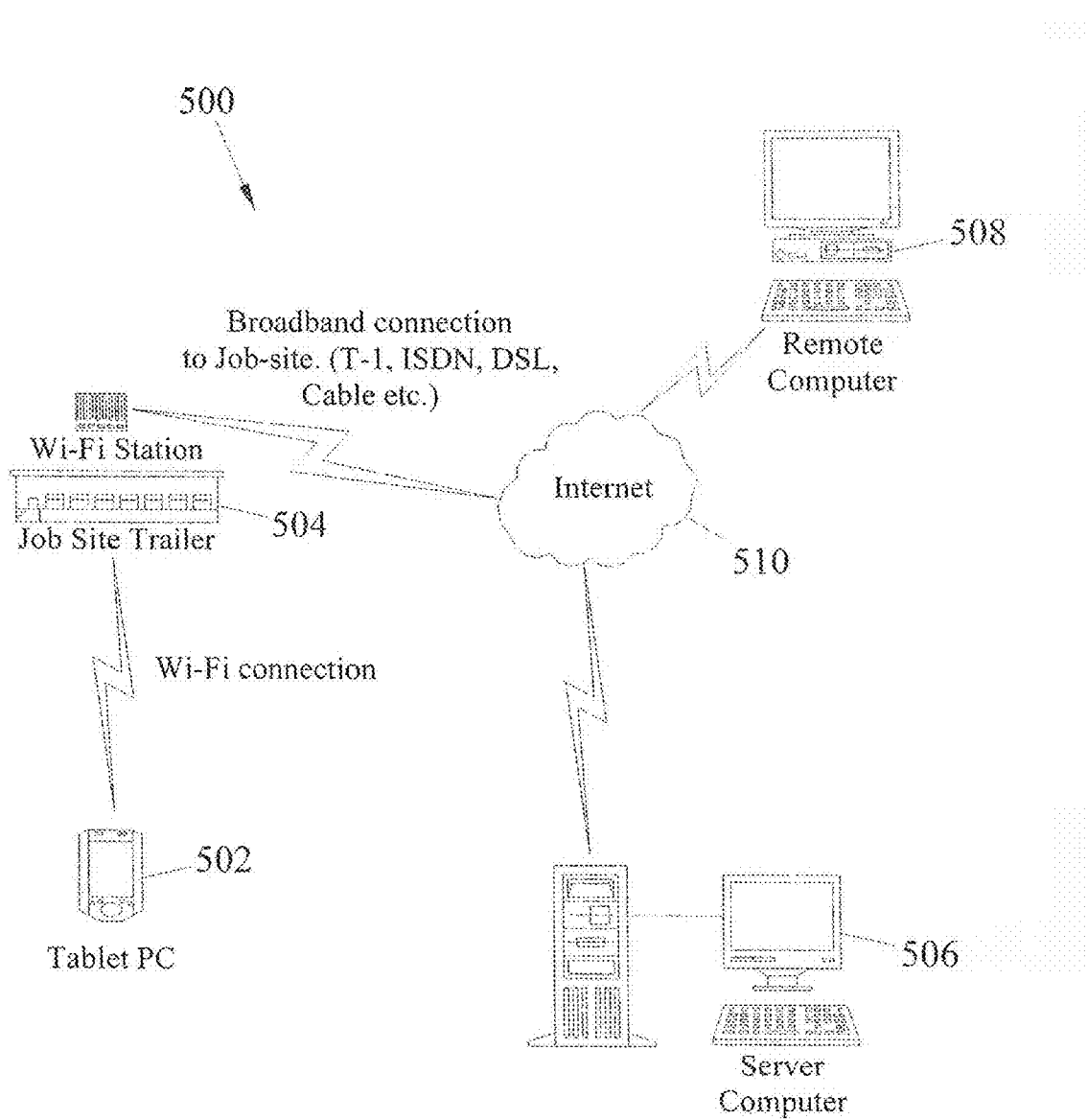
FIG. 5 is another schematic diagram of a job site communications system.

According to one embodiment, a tablet PC can communicate with a wireless-fidelity (Wi-Fi) access point or a second computer on the job site via Wi-Fi communications. The second computer can serve as a medium for communicating data between the tablet PC and a remote computer. Referring to FIG. 5, another schematic diagram of a job site communications system, generally designated 500, is illustrated. Job site communications system 500 can include the following: a tablet PC 502, a Wi-Fi access point 504; a server computer 506; and a remote computer 508. Tablet PC 502 and Wi-Fi access point 504 can communicate via a Wi-Fi connection. Wi-Fi access point 504 can communicate with the Internet 510 via a standard broadband connection, such as with a digital subscriber line (DSL), a T-1 line, or an integrated services digital network (ISDN) e-Point connection.

Referring again to FIG. 1, the CONSTRUCT-CONNECT™ software application can enable tablet PC 102 to convert paper reports into digital documents and enable real-time transmission to remote computer 108. Paper reports can be converted to a format for display on tablet PC 102. An operator can complete the form using a stylus for transmission to remote computer 108 or other suitable computer. Tablet PC 102 can include a forms engine for allowing key field areas on a form to be isolated and used by the end user. The key field areas can then perform handwriting recognition, or be mapped to backend data, such as pricing, inventory, material data sheets, order forms, reports, or installation and safety documentation.

According to one aspect, an operator can use remote computer 108 to transmit a request for a photograph, video, sketch, or annotated CAD drawing of a specific area of a building structure at a job site. First, the operator can use remote computer 108 to select a specific area of a building structure using a CAD viewer application. Remote computer 108 can display a CAD document of the job site plans. The operator can select a particular area of the job site plans and transmit information to tablet PC 102 for requesting a photograph of the actual area of the job site. After receiving the information request, tablet PC 102 can alert an operator to the request for a photograph. The operator can use the digital camera of tablet PC 102 to capture a photograph of the requested area of the job site. The operator can also use tablet PC 102 for annotating the document prior to transmission. Next, tablet PC 102 can transmit the captured photograph to remote computer 108.

According to another aspect, remote computer 108 can automatically transmit, or push, CAD documents or other documents described herein to tablet PC 102 as the CAD documents are updated, modified, or created. This transmission can occur without receiving a request for the CAD documents from tablet PC 102. After receiving updated or modified CAD documents, tablet PC 102 can replace outdated CAD documents with the updated or modified CAD documents. Additionally, remote computer 108 can simultaneously push the CAD documents or other documents described herein to more than one tablet PC or wireless communications device. Tablet PC 102 can consume these documents automatically, in background operations, without operator interaction or polling.

Figure 6A:
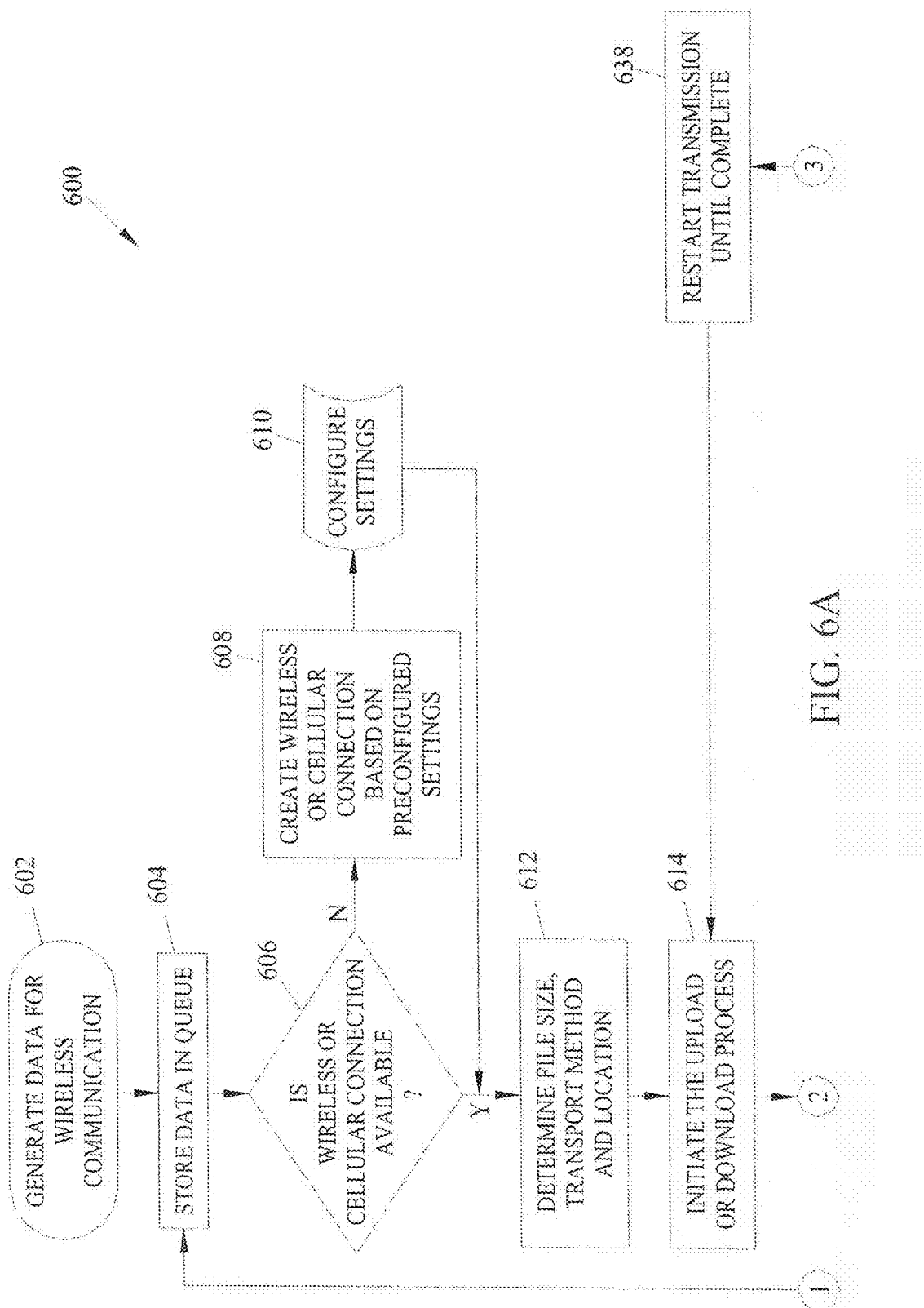
FIGS. 6A-6C are flow charts of a process for automatically transmitting an envelope or document via wireless communication.
Figure 6B:
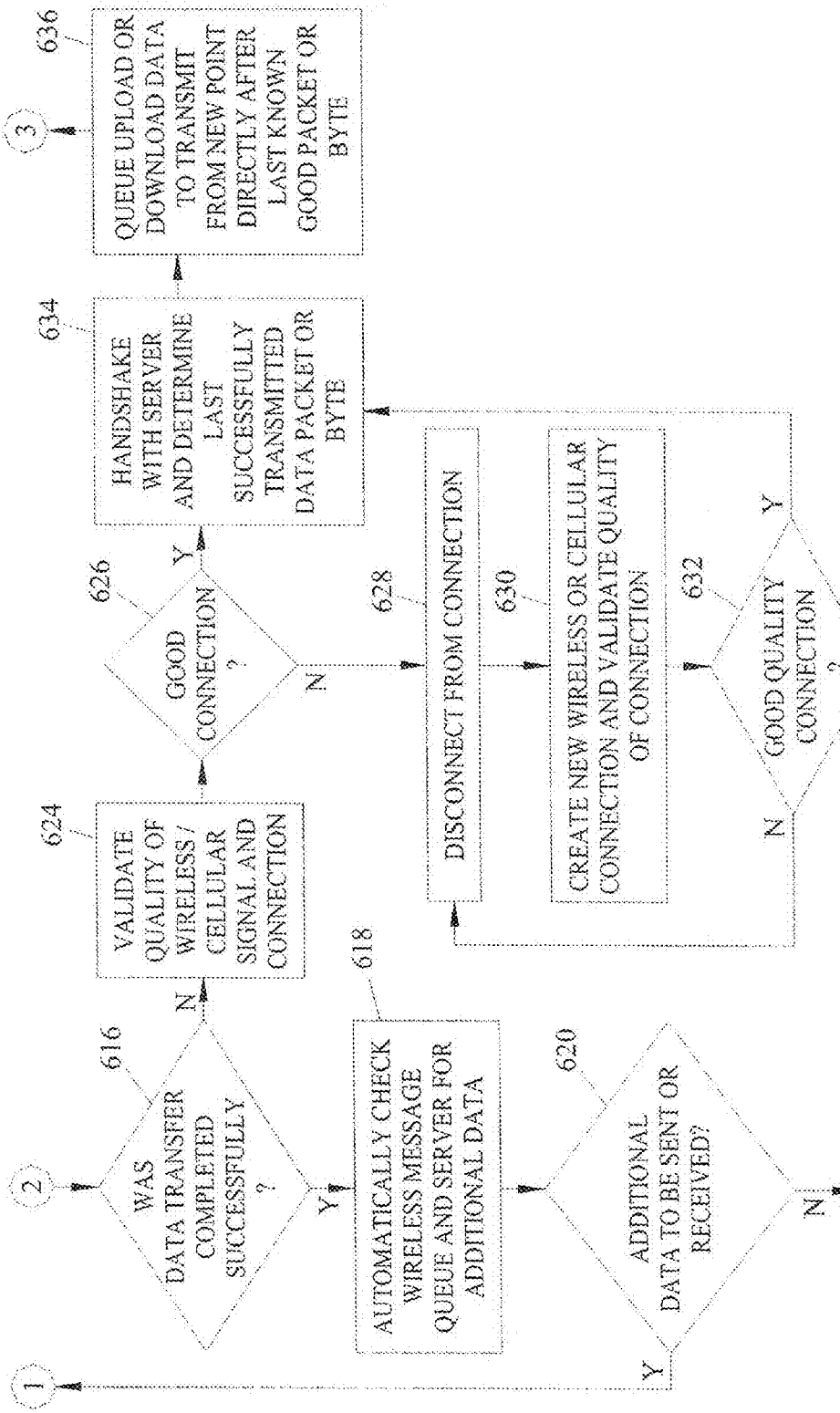
Figure 6C:
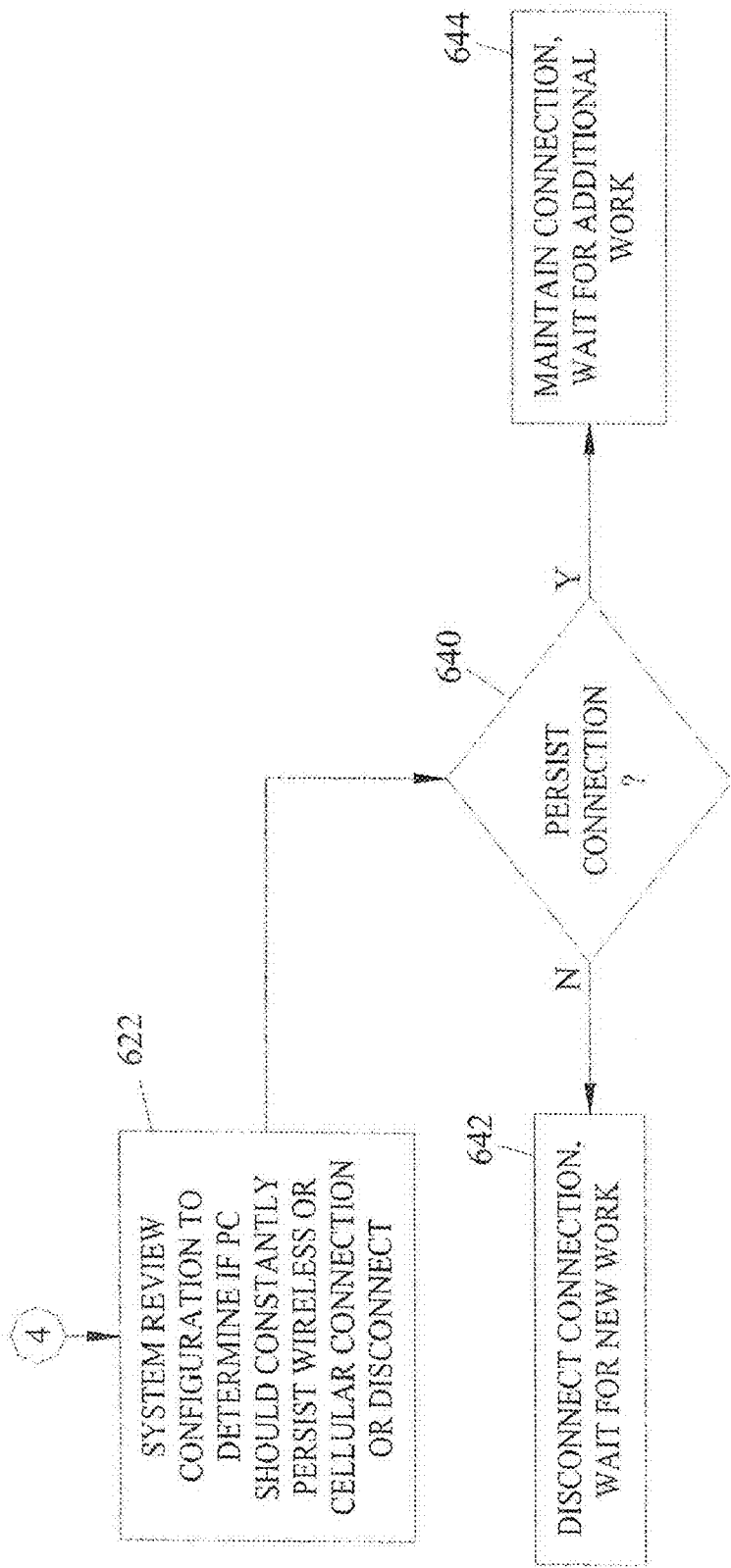

According to one embodiment, tablet PC 102 can provide automated resume operability for sending digital envelopes or other documents. For example, a tablet PC operator can operate tablet PC 102 to generate an envelope or document for transmitting to computer 106 or 108. Next, the operator can operate tablet PC 102 to send the envelope or document. According to one embodiment, the operator can send the envelope or document with a "one-touch" operation wherein the envelope is prepared and table PC 102 automatically handles the transmission of the envelope or document. Without further operator input, tablet PC 102 can continue efforts to communicate the envelope or document. This is especially advantageous when communicating wirelessly because wireless communication can be prone to a break in communication when transmitting large envelopes or documents. FIGS. 6A-6C are flow charts, generally designated 600, illustrating a process for automatically transmitting an envelope or document via wireless communication. Referring specifically to FIG. 6A, the process begins at the step indicated by reference numeral 602 where an operator or process generates an envelope, document, or other suitable data for wireless communication (such as cellular-based communication) to a remote computer. According to one embodiment, the process shown in FIGS. 6A-6C can be managed and implemented by communication interface 208.

At step 604 of FIG. 6A, tablet PC 102 can store the data in a wireless message queue. Next, tablet PC 102 can determine whether a wireless or cellular connection is available (step 606). If a connection is not available, tablet PC 102 utilizing the CONSTRUCTCONNECT™ software can create a wireless or cellular connection based on pre-configured settings (step 608). Next, at step 610, tablet PC 102 can configure settings for the connection and proceed to step 612.

If a wireless or cellular connection is available or has been established in steps 608 and 610, tablet PC 102 can determine the size of the data, a transport method, and location for delivering the data (step 612). Next, at step 614, tablet PC 102 can initiate the upload or download process for transferring the data to or from the remote computer. Referring now to FIG. 6B, tablet PC 102 can then determine whether the data transfer was completed successfully (step 616).

Referring to FIG. 6B, if the data transfer was completed successfully, tablet PC 102 can automatically check the wireless message queue for additional data (step 618). Next, at step 620, it is determined whether additional data is to be transmitted or received. If there is additional data, the process can proceed to step 606. Otherwise, the process proceeds to step 622 of FIG. 6C.

Referring again to step 616 of FIG. 6B, if it is determined that the data transfer was not completed successfully, the process can proceed to step 624. Tablet PC 102 can automatically validate the quality of the wireless or cellular signal and connection (step 624) and determine whether the connection is good (step 626). The connection is not good if it is low quality or corrupt. If the connection is not good, tablet PC 102 can disconnect from the connection (step 628). In addition, tablet PC 102 can create a new wireless or cellular connection and validate the quality of the new connection (step 630). If the quality of the new connection is not good, the process can proceed to step 628. Otherwise the process can proceed to step 634.

If the connection is determined to be good at steps 626 or 632, tablet PC 102 can handshake with the remote computer or server and determine the last successfully transmitted data, such as data packet or byte (step 634). Next, at step 636, tablet PC 102 can queue data to restart transmission from the point after the last known transmitted data. Referring to FIG. 6A, transmission can be restarted for transmission until the data has been fully transmitted (step 638).

Referring again to step 622 of FIG. 6C, tablet PC 102 can review the configuration for determining whether it should constantly persist wireless or cellular connection or disconnect from the connection based on predefined values in the systems configuration file. The settings can also be configured. At step 640, tablet PC 102 determines whether to persist the connection, even if the connection is interrupted. If it is determined not to persist the connection, tablet PC 102 can disconnect and wait for new data for transmission (step 642). Otherwise, tablet PC 102 can maintain the connection until data transmission is complete and then wait for additional data to transmit (step 644). Thus, process 600 can provide a method for automatically handling the transmission of data to a remote computer.

As stated above, tablet PC 102 can communicate and process paper-based daily reports and punch lists, paper-based ordering material, and delivery scheduling. These documents can be displayed to an operator on the display of tablet PC 102. The operator can use a stylus for inputting text and other markings into blanks, or data entry portions, of these documents. Tablet PC 102 can interpret the operator's input for conversion to computer-readable text or other data type. FIGS. 7-15 illustrate exemplary screen displays for tablet PC 102.

Figure 7:
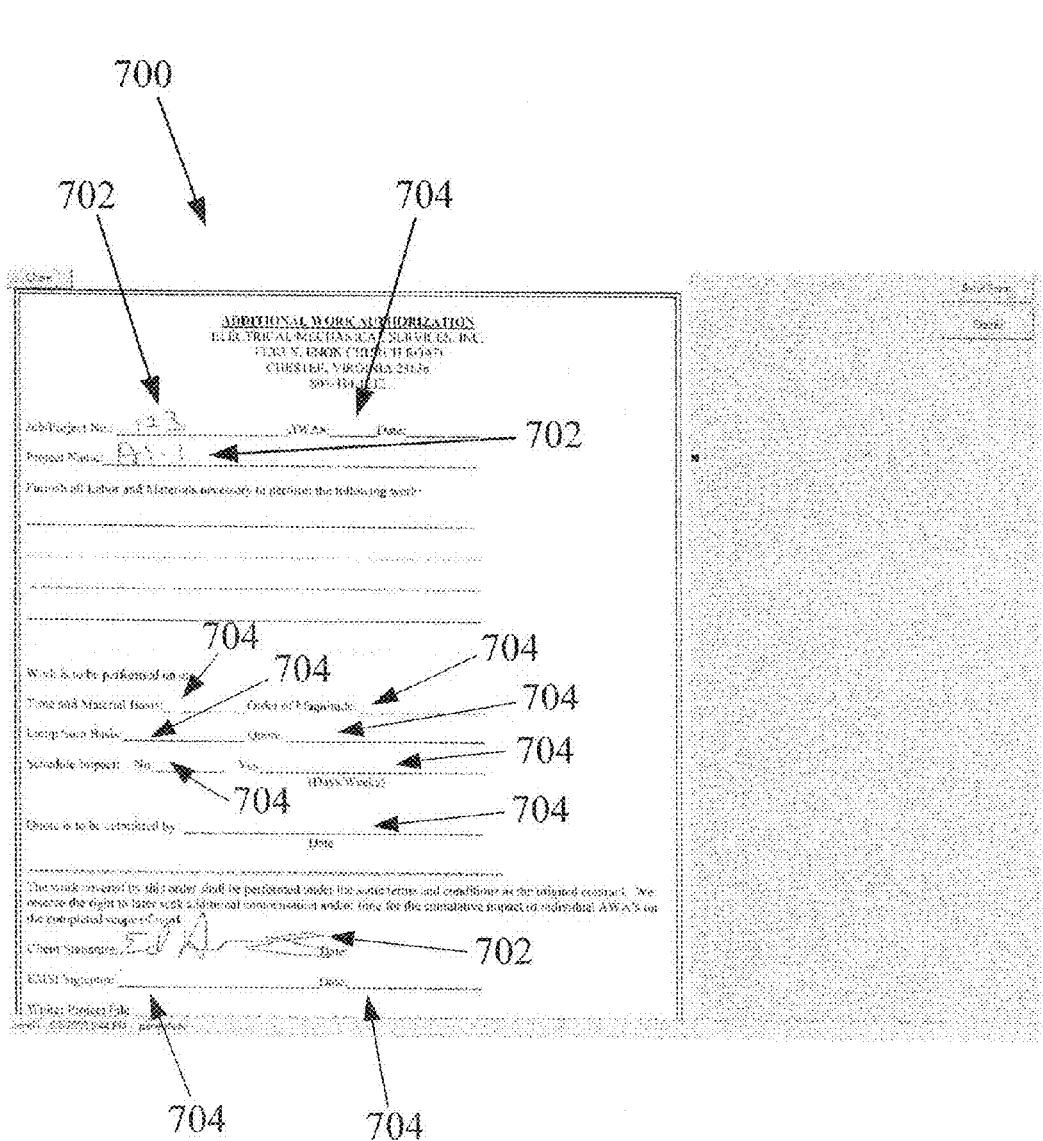
FIG. 7 is an illustration of an exemplary screen display of a tablet PC displaying a work authorization form.

FIG. 7 illustrates an exemplary screen display, generally designated 700, of tablet PC 102 displaying a work authorization form. The form displayed on screen display 700 can include several uncompleted data entry portions, generally designated 702. The form also includes data entry portions, generally designated 704, that have not been complete by the operator. After completion of the form, the form and interpreted input can be transmitted to remote computer 108 for authorizing work. Tablet PC 102 can also utilize a screen display, such as screen display 700, for receiving a user's signature. The signature can be captured by tablet PC 102 and transmitted as data.

Figure 8:
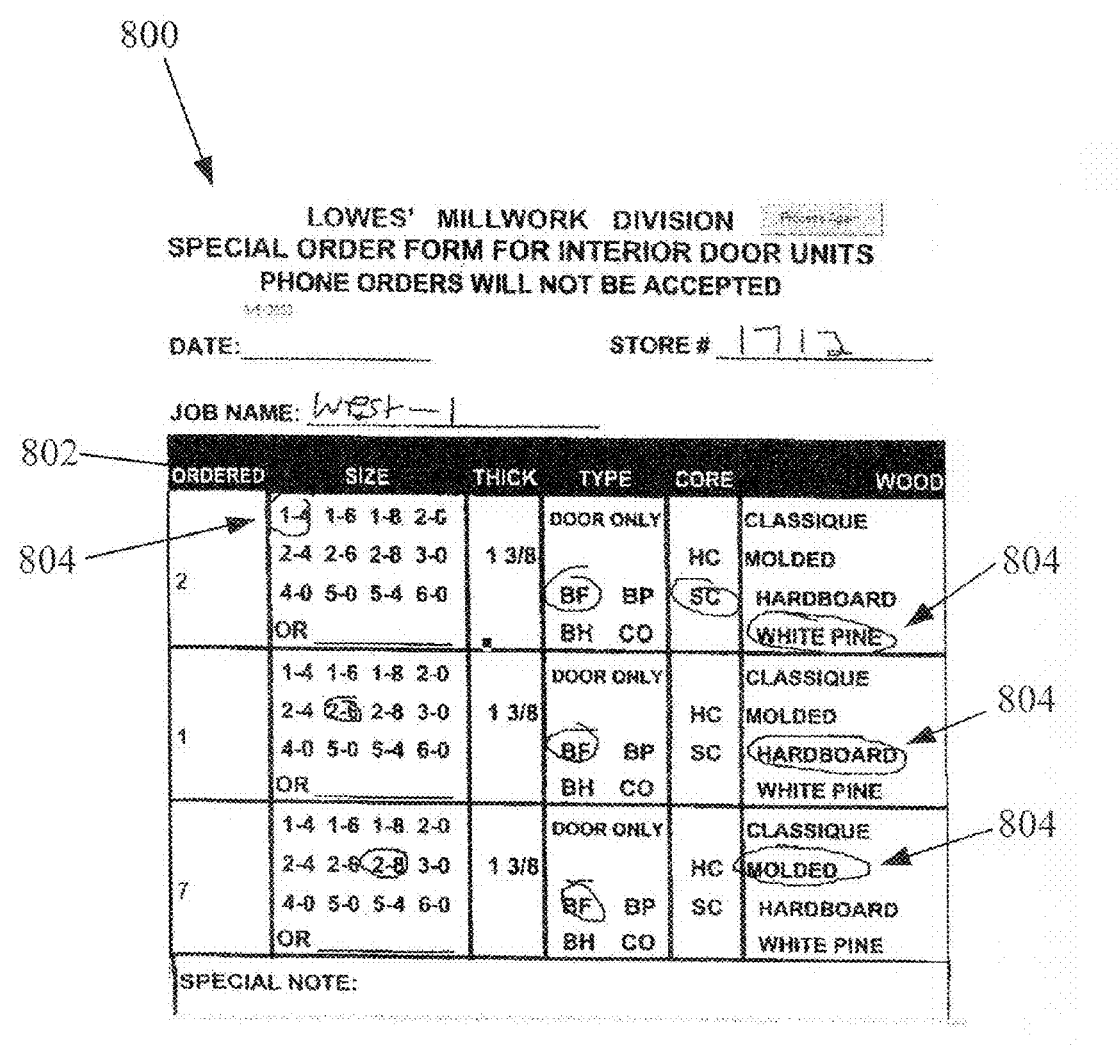

FIG. 8 illustrates an exemplary screen display, generally designated 800, of tablet PC 102 displaying a product order form. The form displayed on screen display 800 can include a table 802 listing a number of order specifications such as order quantity, size, thickness, type, and wood type. The operator can select a specific order quantity, size, thickness, type, or wood type by using the stylus to circle an order specification, as generally designated by reference numerals 804. Tablet PC 102 can interpret the operator's input for completing the order. After completion of the form, the form and interpreted input can be transmitted to remote computer 108 to place the order.

Figure 9:
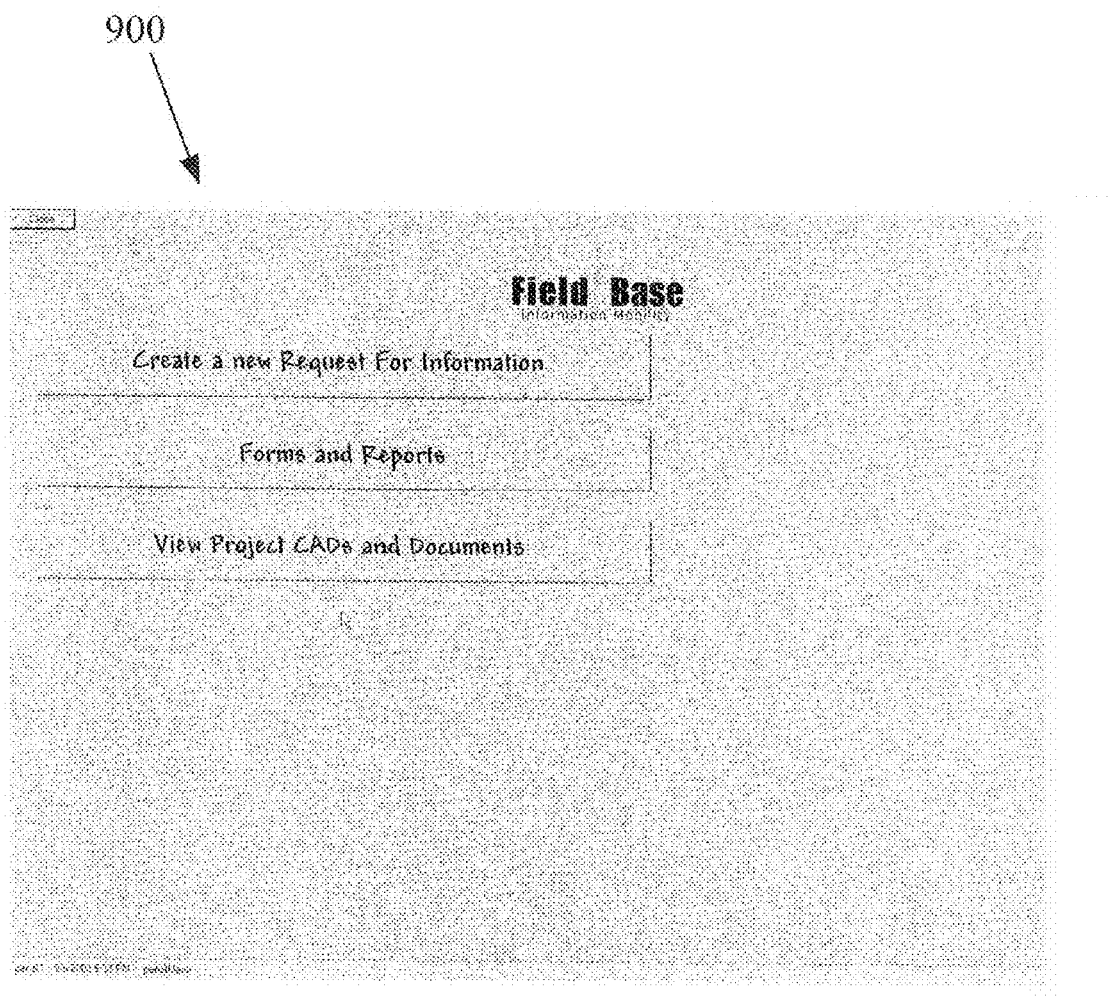
FIG. 9 is an illustration of an exemplary screen display of a tablet PC displaying a main menu.

FIG. 9 illustrates an exemplary screen display, generally designated 900, of tablet PC 102 displaying a main menu. The operator can use the stylus of tablet PC 102 to select one of icons 902, 904, and 906. Selection of icon 902 can provide another screen display for sending or requesting information from remote computer 108. Selection of icon 904 can provide forms and reports for transmission to remote computer 108. Selection of icon 906 can provide a view of project CAD documents and other available documents.

Figure 10:
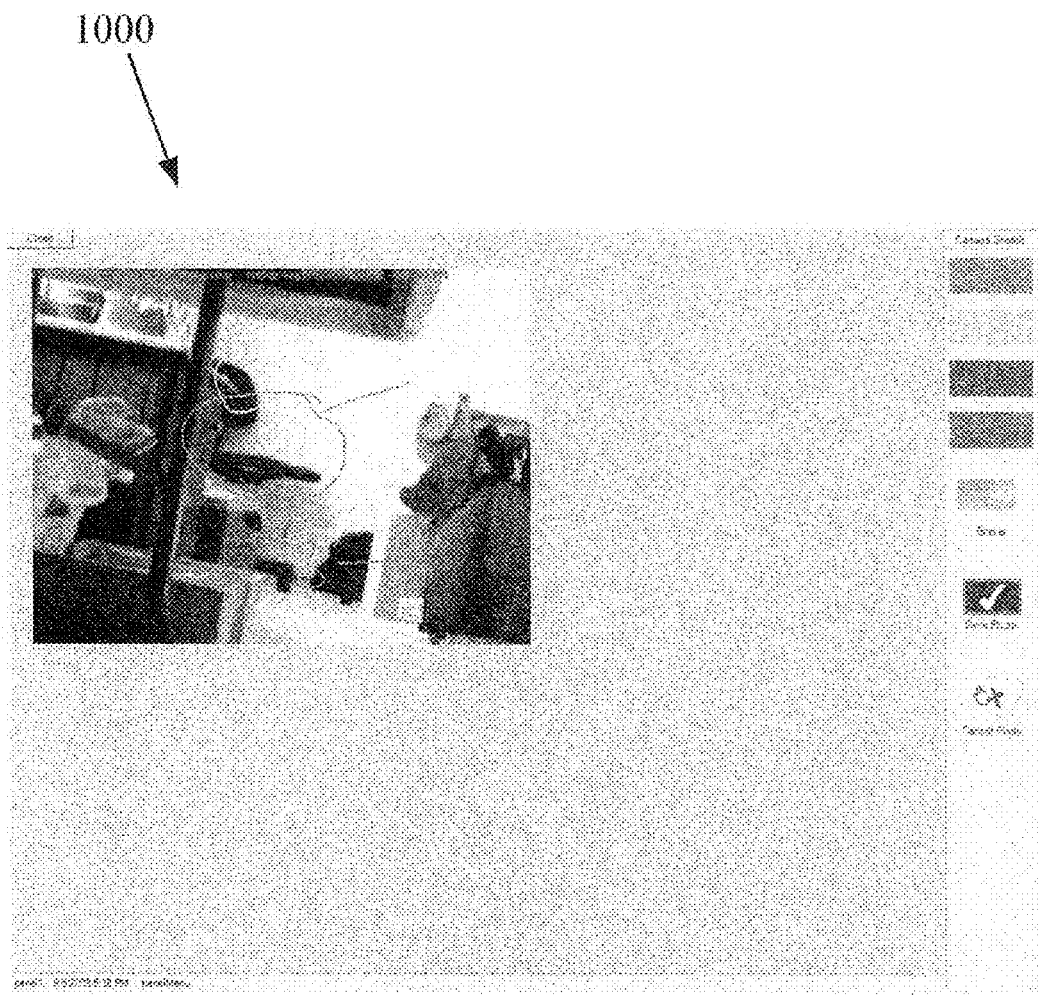
FIG. 10 is an illustration of an exemplary screen display of a tablet PC displaying an annotated photograph.

FIG. 10 illustrates an exemplary screen display, generally designated 1000, of tablet PC 102 displaying an annotated photograph.

Figure 11:
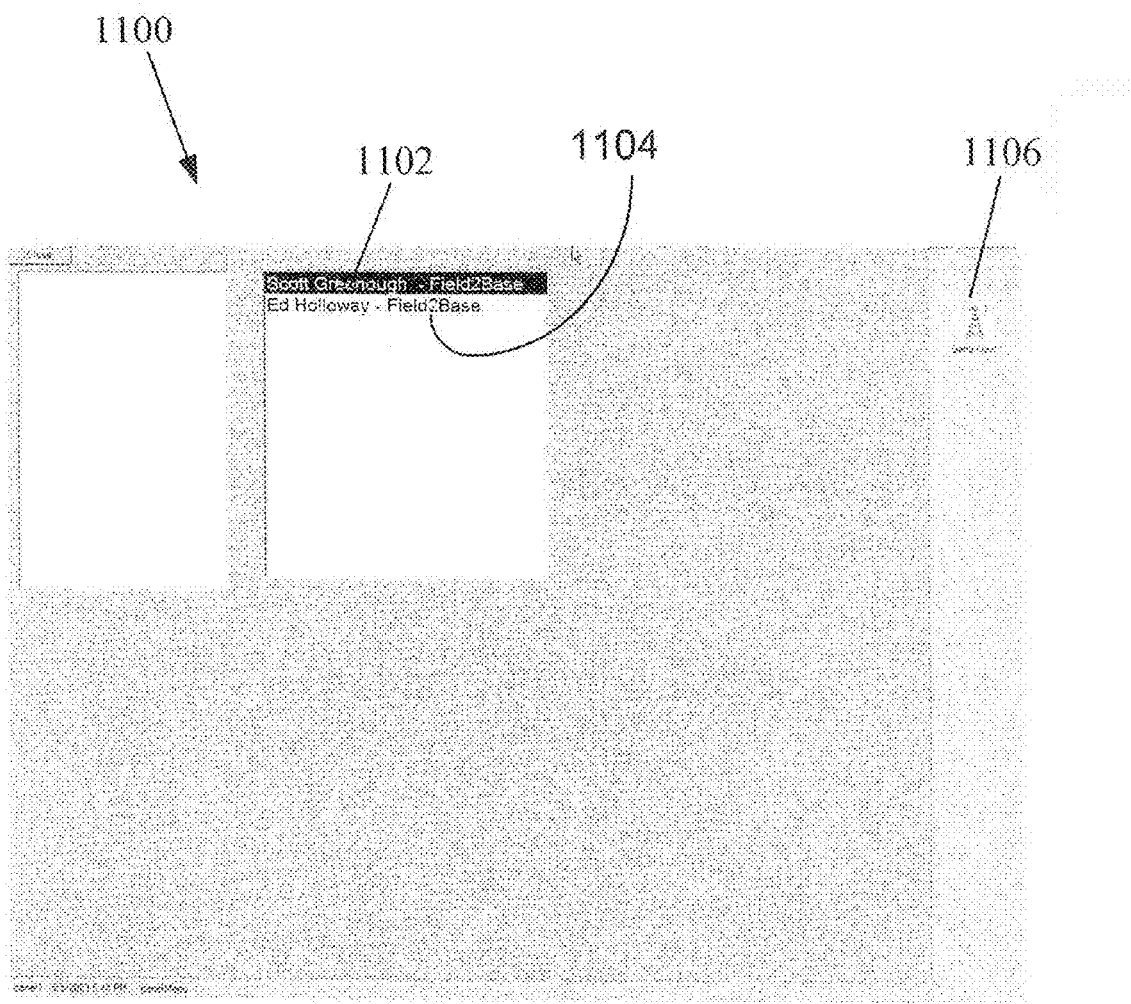
FIG. 11 is an illustration of an exemplary screen display of a tablet PC displaying a transmission device.

FIG. 11 illustrates an exemplary screen display, generally designated 1100, of tablet PC 102 displaying a transmission interface. An operator can select one or more recipients 1102 and 1104 for transmitting one or more documents described herein. Once a recipient is selected, the operator can select a send icon 1106 for transmitting the documents.

Figure 12:
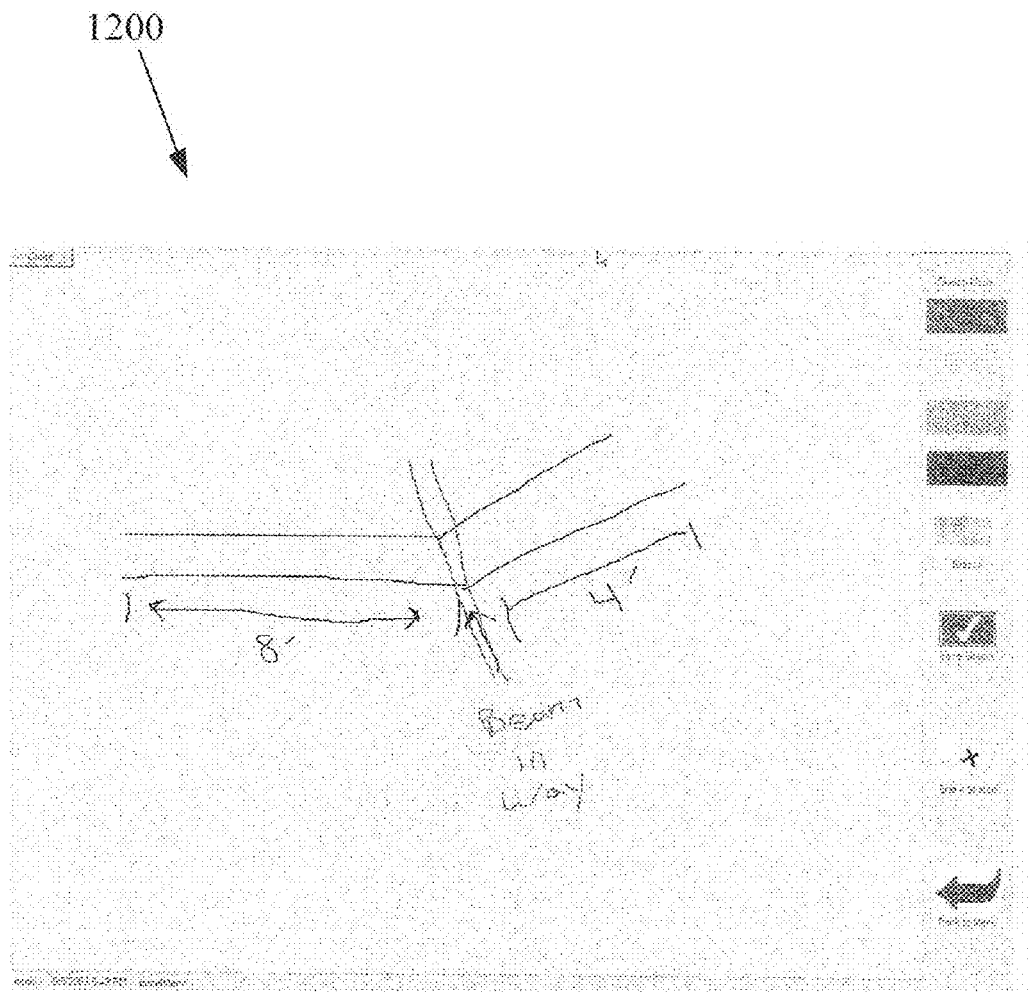
FIG. 12 is an illustration of an exemplary screen display of a tablet PC displaying a sketchpad.

FIG. 12 illustrates an exemplary screen display, generally designated 1200, of tablet PC 102 displaying a sketchpad. The operator can enter sketches, drawings, or notes on the sketchpad by using the stylus of tablet PC 102. After completion, the drawing can be transmitted to remote computer 108.

Figure 13:
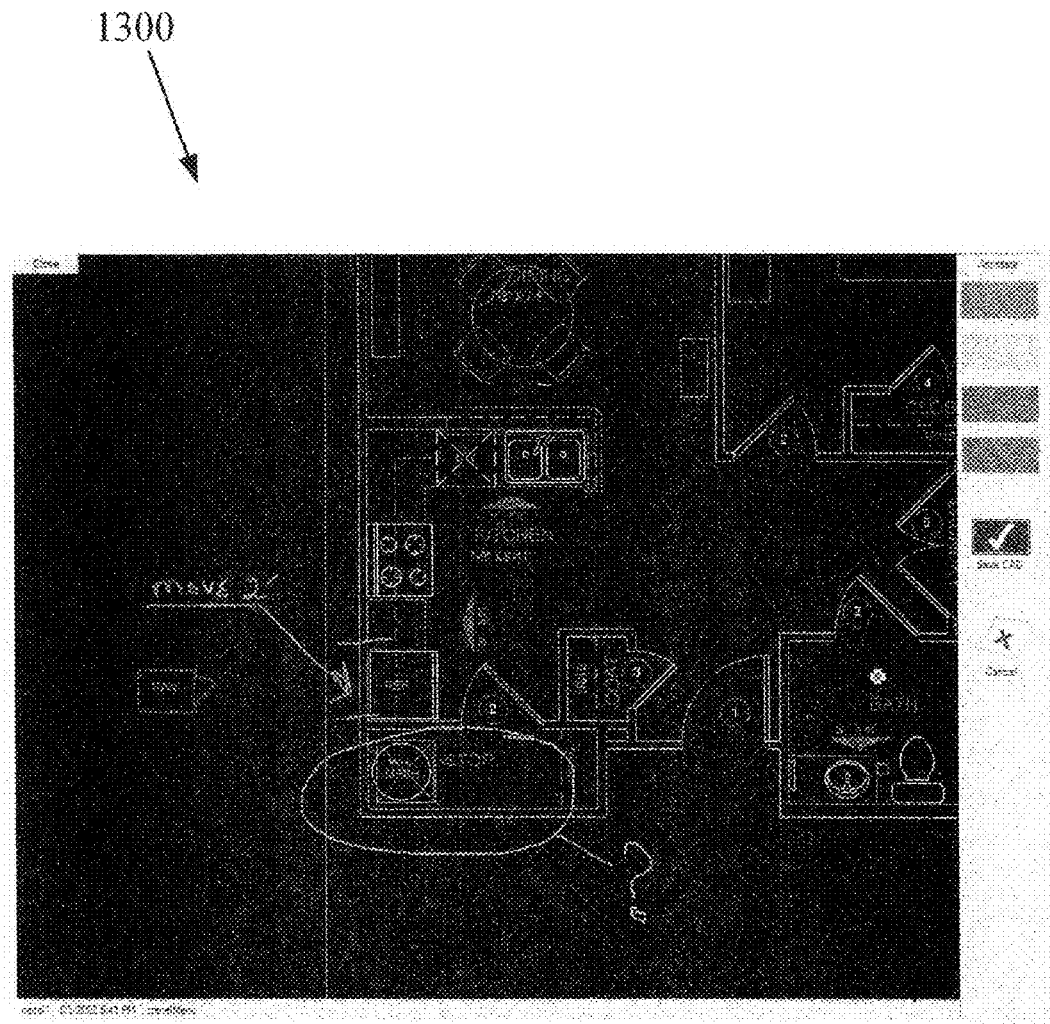
FIG. 13 is an illustration of an exemplary screen display of a tablet PC displaying an annotated CAD drawing.

FIG. 13 illustrates an exemplary screen display, generally designated 1300, of tablet PC 102 displaying an annotated CAD drawing. The CAD drawing can be annotated with sketches, drawings, or notes and subsequently transmitted to remote computer 108. The operator can annotate the CAD drawing by using the stylus to write or draw on the CAD drawing.

Figure 14:
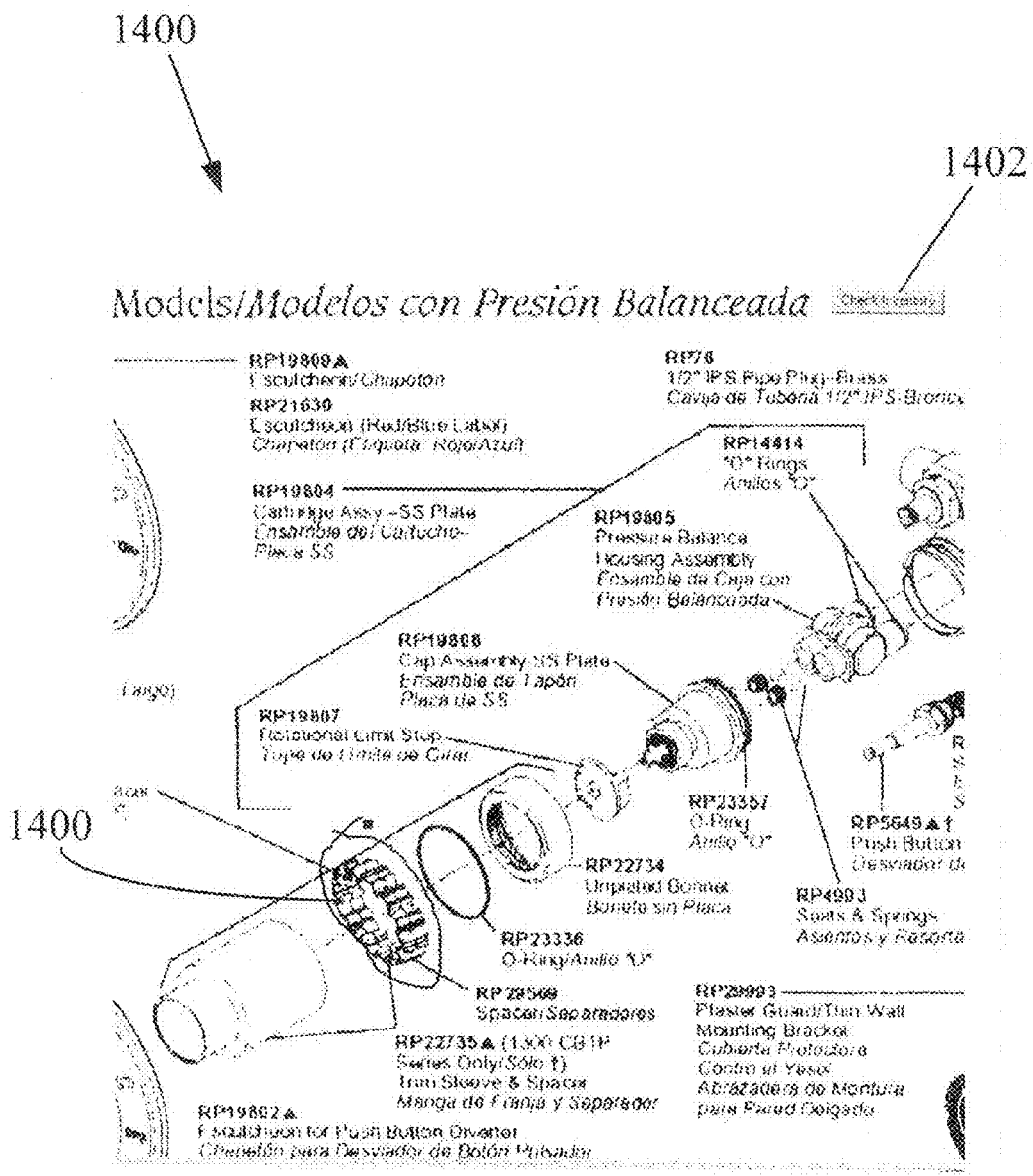
FIG. 14 is an illustration of an exemplary screen display of a tablet PC displaying a parts catalog.
Figure 15:
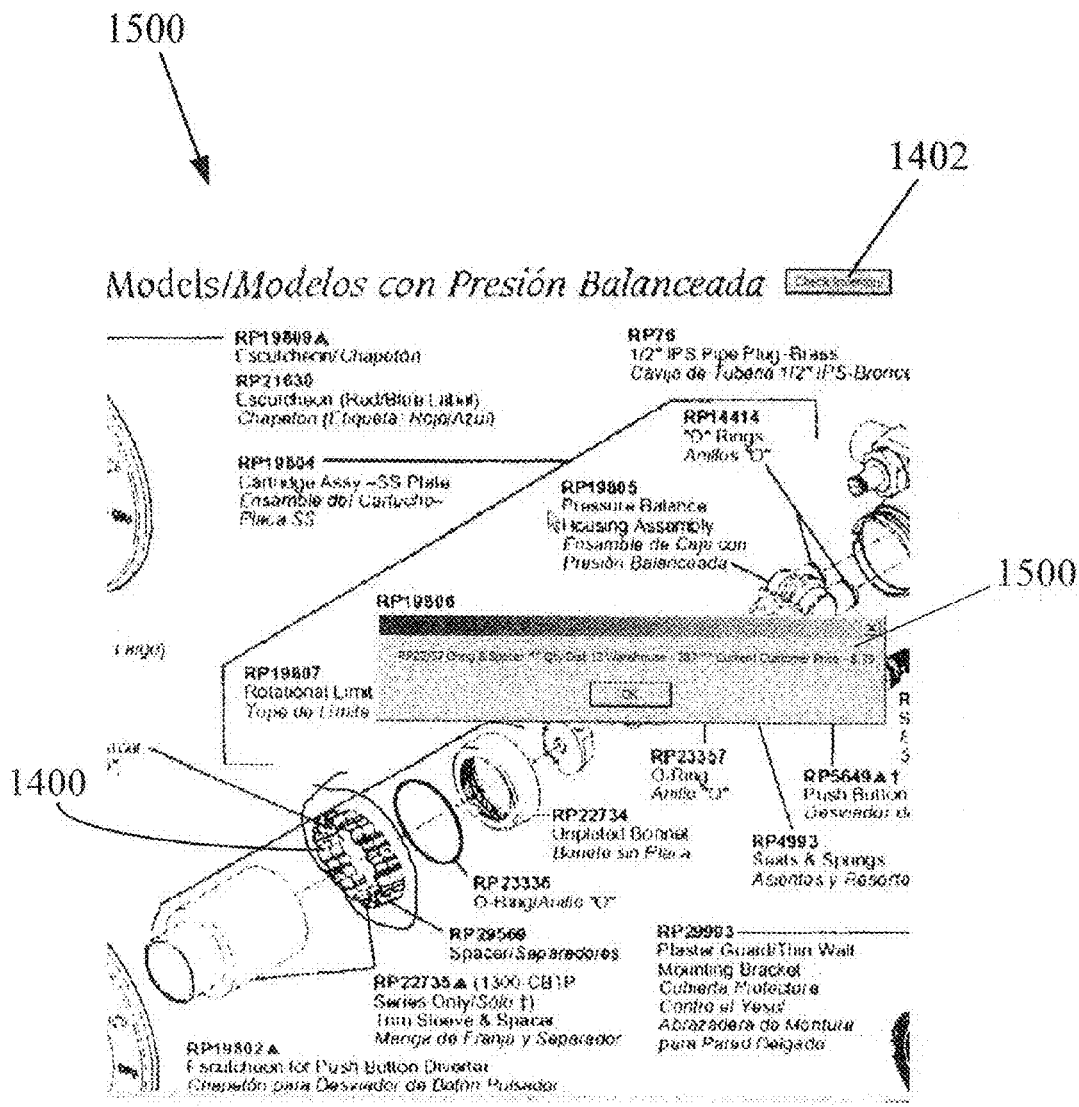
FIG. 15 is another illustration of an exemplary screen display of a tablet PC displaying the parts catalog shown in FIG. 14.

FIGS. 14 and 15 illustrate exemplary screen displays, generally designated 1400 and 1500, respectively, of tablet PC 102 displaying a parts catalog. Tablet PC 102 can be operable to display a selected catalog page for retrieving information about the part components shown on the page. Referring specifically to FIG. 14, the tablet PC operator can use the stylus to circle a part component 1400 and select the check inventory icon 1400 for requesting information about the part from remote computer 108. Remote computer 108 can receive the information request for the part and transmit the information to tablet PC 102. Referring to FIG. 15, when the information has been received, tablet PC 102 can display a window including the requested information for the part. According to one embodiment, pricing information can be obtained via tablet PC 102. In addition, orders can be allowed via tablet PC 102.

It will be understood that various details of the subject matter disclosed herein may be changed without departing from the scope of the subject matter disclosed herein. Furthermore, the foregoing description is for the purpose of illustration only, and not for the purpose of limitation—the subject matter disclosed herein being defined by the claims.

The invention claimed is:

1. A method for communicating one or more complex documents to a list of one or more recipients in a plurality of successive connections to a wire communication system comprising:
 a) causing a sending computer having a plurality of means to connect to the wire communications system to populate an envelope in a sending computer memory with the one or more complex documents;
 b) creating a list of recipients in the sending computer memory;
 c) sending the populated envelope and list of recipients in a plurality of successive transmissions to the wire communication system by performing the steps of:
  i. selecting a preferred connection from the plurality of means to connect to the wire communications system and connecting to the wire communications system;
  ii. determining if the connection is good;
  iii. disconnecting the connection any time the connection is determined not to be good;
  iv. disconnecting a wireless or cellular connection to the wire communication system based on a predefined value found in a systems configuration file;
  v. transmitting a portion of at least one of the populated envelope and the list of recipients until the envelope and list are completely transmitted or the connection is disconnected or lost; and
  vi. Repeating steps i. through iv. after the connection is disconnected or lost if the envelope and list are not completely transmitted, locating the same or different connection each time step i. is performed and starting each successive transmission from the point after the last known transmission until the populated envelope and list of recipients have been completely transmitted to the wire communication system with the caveat that prior to the completion of the transmission at least 2 different connection means have been selected.

2. A method according to claim 1 which further comprises a server separate from the plurality of means to connect to the wire communication system receiving and retaining the portions of the populated envelope and list of recipients received from the sending computer over the wire communication system and combining the portions of the envelope and list of recipients received from the wire communication system until the contents of the envelope and list of recipients is fully received.

3. A method according to claim 2 wherein the server transmits the contents of the envelope to the recipients.

4. A method according to claim 1 wherein one or more receiving computers are positioned to receive the contents of the envelope from the wire communication system.

5. A method according to claim 1 wherein the wire communication system is the Internet.

6. A method according to claim 1 wherein the plurality of means to connect to the wire communications system is selected from the group comprising cellular, wireless and wired connections.

7. A method according to claim 4 wherein a portable computer on a job site transmits the contents of the envelope to one or more receiving computers using at least one wireless communication means to connect to the wire communications system.

* * * * *